United States Patent

Swain et al.

[15] 3,660,614

[45] May 2, 1972

[54] DRIVE FOR TAPE GUIDES OF TAPE TRANSPORT

[72] Inventors: William W. Swain, Mountain View; Richard A. Hathaway, Saratoga, both of Calif.

[73] Assignee: Cartridge Television, Inc., New York, N.Y.

[22] Filed: June 26, 1970

[21] Appl. No.: 50,245

[52] U.S. Cl. .................179/100.2 T, 179/100.2 Z, 242/194, 274/4 C

[51] Int. Cl. .......................................G11b 5/52, G11b 23/08

[58] Field of Search ............179/100.2 T, 100.2 Z, 100.2 MI; 242/55.19 A, 194, 197, 199; 274/4 C, 4 D, 4 E, 11 F, 11 D; 226/196

[56] References Cited

UNITED STATES PATENTS 3,474,195 10/1969 Wada ..............................179/100.2 T

FOREIGN PATENTS OR APPLICATIONS 1,537,240 10/1969 Germany.........................179/100.2 T

OTHER PUBLICATIONS

Automatic Tape Threading, Johnson et al., IBM Technical Disclosure Bulletin, Vol. 9 No. 8 Jan. 1967

*Primary Examiner*—Benedict V. Safourek
*Assistant Examiner*—Richard P. Lange
*Attorney*—Townsend and Townsend

[57] ABSTRACT

Apparatus for moving a pair of tape guides of a tape transport of the type having a rotary head assembly. The guides are adapted to be received within a tape cartridge positioned adjacent to the rotary head assembly and to pull a stretch of tape out of the cartridge and about a portion of the arcuate path of travel of the heads of the assembly. The apparatus includes a pair of arms having drag links pivotally mounted thereon which mount the tape guides. Each drag link has means thereon for properly positioning the same relative to the head path each time the drag link moves its tape guide into an operative position.

20 Claims, 6 Drawing Figures

INVENTORS
WILLIAM W. SWAIN
RICHARD A HATHAWAY
BY
Townsend and Townsend

INVENTORS
WILLIAM W. SWAIN
RICHARD A. HATHAWAY
BY
Townsend and Townsend

INVENTORS.
WILLIAM W. SWAIN
RICHARD A. HATHAWAY
BY
Townsend and Townsend

DRIVE FOR TAPE GUIDES OF TAPE TRANSPORT

This invention relates to improvements in tape transport systems and, more particularly, to a drive apparatus for a tape guide structure of a tape transport adapted for use with a tape cartridge.

In using a tape cartridge with a tape transport having a rotary head assembly, it is necessary to present the tape from the cartridge to the head assembly in such a way that the tape can move relative to the assembly as the heads thereof scan the tape. Also, it is essential that the tape must be presented to the heads at a helix angle if the heads are to scan the tape along oblique paths thereon. This latter feature permits the head assembly to achieve the tape-conserving aspects of the skip-field principle wherein selected fields of a series of video image frames are recorded on the tape and each field is later played back several times to provide a video picture of acceptable quality.

One way of presenting the tape to a rotary head assembly is to pull the tape out of the cartridge by a pair of spaced tape guides which are received within recesses in the cartridge behind the tape so that the back side of the tape can be engaged by the guides and pulled outwardly of the cartridge toward the head assembly. It is important that the means for moving the guides be constructed to assure that the guides are properly positioned adjacent to the head assembly so that the tape will be presented to the path of travel of the heads at a desired helix angle and along a predetermined arc of the head assembly.

The present invention is directed to a means for moving a pair of tape guides of the type described from positions within a tape cartridge behind a tape stretch near an open extremity of the cartridge to operative positions near a rotary head assembly at which the guides support the ends of the tape stretch in a manner to assure that the stretch will be at the proper helix angle at all times and the guides will be firmly held against relative movement away from the head assembly. To this end, the drive means of the present invention includes a number of arms coupled with the tape guides for moving the same along paths which permit the tape stretch to be pulled straight out of the cartridge and then about the head assembly. The latter feature permits the width of the cartridge to be minimized since the guides do not initially move away from the cartridge along arcuate paths.

The invention also includes means defining tracks for the arms which move the guides. This feature assures that the guides will move along the desired paths and also eliminates the need for close tolerances until the guides approach their operative positions.

Another aspect of the invention is the way in which the drive means operates to advance a pinch roller from within the cartridge to an operative position at which it forces the tape against a rotatable capstan as a function of the movement of the guides into their operative positions. This feature assures that the tape will be moved into engagement with the capstan at the proper time so that the tape can be advanced about the rotary head assembly when the guides are properly positioned relative thereto.

The primary object of this invention is to provide a means for mounting and moving a pair of spaced tape guides adapted to pull a stretch of magnetic tape out of a cartridge and partially about a rotary head wherein the mounting and moving means firmly hold the tape guides in fixed positions after moving the tape guides initially straight out of the cartridge and then about a portion of the head assembly to thereby assure a desired helix angle between the axis of the tape and the plane of rotation of the adjacent heads of the head assembly while, at the same time, the cartridge used with the invention can be of minimum width.

Another object of this invention is to provide a drive apparatus for moving a pair of tape guides of the type described wherein the apparatus includes a number of arms which are guided by tracks to position the tape guides properly relative to the head assembly, whereby close tolerances are not required until the guides approach their operative positions to thereby simplify the construction of the drive means without impairing the precision with which the guides are positioned relative to the head assembly itself.

A further object of this invention is to provide a drive apparatus of the type described which has means thereon for moving a pinch roller out of a tape cartridge in response to movements of the tape guides so that the pinch roller can be moved against the tape to force it against a rotatable capstan at the proper time so that the tape can be moved past the rotary head assembly when the tape guides are properly positioned relative thereto.

Other objects of this invention will become apparent as the following specification progresses, references being had to the accompanying drawings for an illustration of an embodiment of the invention. In the drawings.

Figure 3:
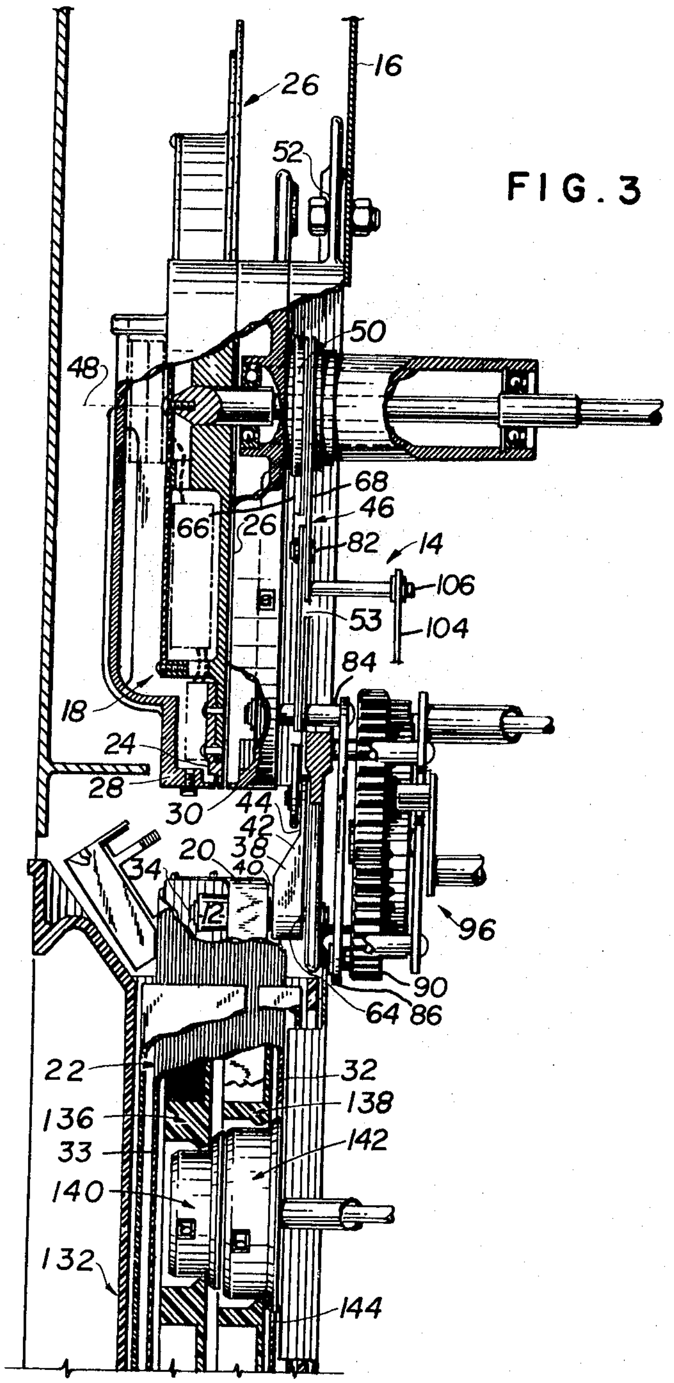
FIG. 3 is a vertical section through the head assembly, showing the drive apparatus of this invention.

A pair of tape guides 10 and 12 are coupled by drive apparatus 14 to a base plate 16 for movement from retracted positions (FIGS. 1 and 6) to operative positions adjacent to the outer periphery of a rotary head assembly 18 (FIG. 3) forming a part of a tape transport. The tape guides are adapted to pull a stretch 20 of a magnetic tape in a cartridge 22 in a direction out of the cartridge and about a portion of the arcuate path of travel of one or more magnetic heads 24 mounted on a disk 26 adjacent to the outer periphery thereof, head or heads 24 and disk 26 forming parts of rotary head assembly 18 (FIG. 3). In their operative positions, the tape guides support the ends of the tape stretch when the latter is contoured by fixed, semi-cylindrical guide members 28 and 30 (FIG. 3), such members being on opposite sides of disk 26. Thus, the tape can move relative to and along the fixed guide members as disk 26 rotates relative thereto. Head 24 can then scan the tape.

Figure 6:
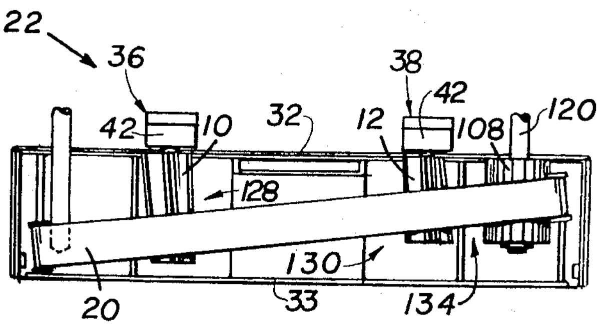

Preferably, assembly 18 has a number of heads 24 so that it can utilize the skip-field principle for the recording and play back of video signals on the tape. To utilize this principle, tape stretch 20 must be played to the path of the heads at a helix angle and the heads must be axially staggered relative to each other. Guides 10 and 12 are shaped to present tape stretch 20 at the desired angle since the tape guides are of different lengths as shown in FIG. 6 and pull stretch 20 initially straight out of the cartridge as hereinafter described. As shown in FIG. 6, the tape is carried by the cartridge 22 at an angle to the planes of the front and rear walls 32 and 33.

Figure 2:
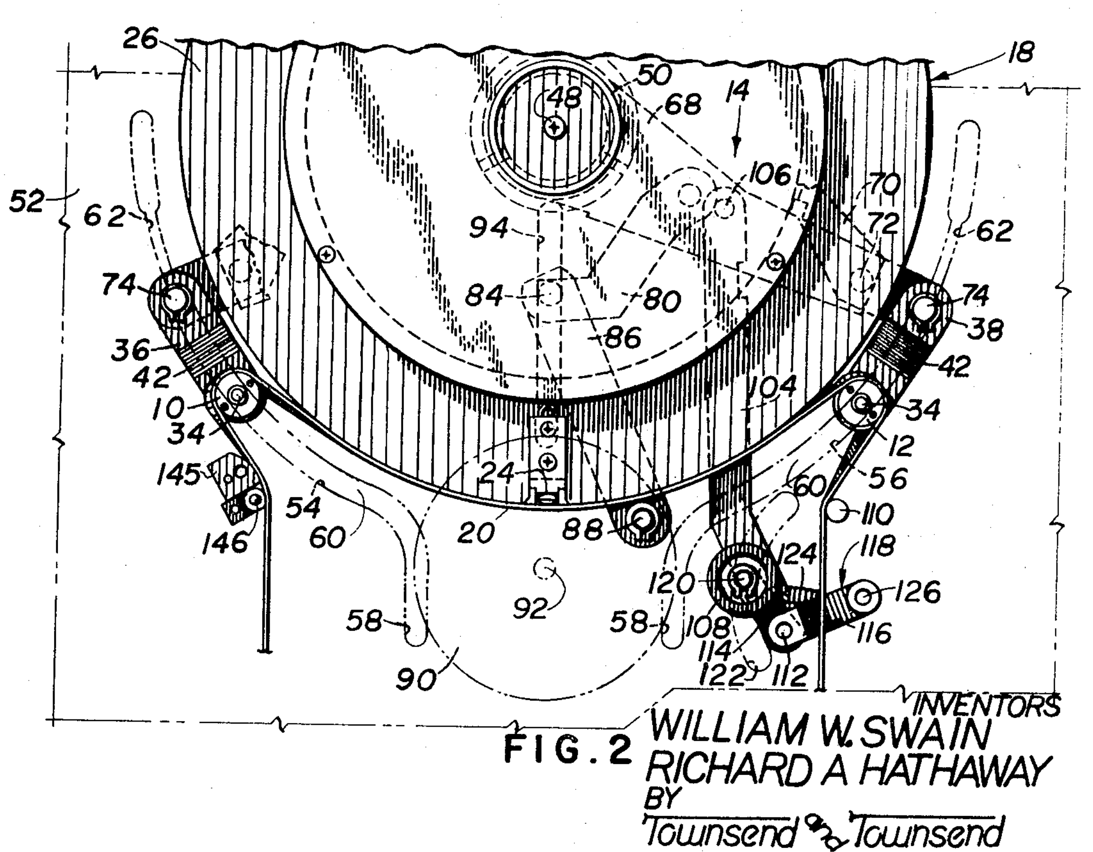
FIG. 2 is a view similar to FIG. 1 but showing the apparatus behind a rotary head assembly, the guides being in partially advanced positions.

Tape guides 10 and 12 are rigidly secured by attachment devices 34 to respective drag links 36 and 38 with each guide extending laterally from a surface 40 of the corresponding drag link. Each drag link has an inclined surface 42 which extends away from surface 40 (FIG. 3) and a mounting tab 44 which is pivotally coupled to arm structure 46 for rotation about the central axis 48 of disk 26 (FIG. 2). Base plate 16 is, for purposes of illustration, vertically disposed so that axis 48 is generally horizontal. Disk 26 is rotatably mounted to an arbor 50 which is secured to a support plate 52 secured by screws to the base plate (FIG. 3). Guide members 28 and 30 are rigidly secured to support plate 52 in suitable manner, with guide member 30 being spaced laterally from the plane of the base plate to present a space 53 for receiving arm structure 46. Support plate 52 has a pair of grooves defining respective tracks 54 and 56 for drag links 36 and 38, respectively (FIG. 2). Each track 54 has a straight portion 58 and an arcuate portion 60 connected with portion 58. Each arcuate portion has a restricted section 62 which is remote from the corresponding straight portion 58.

Figures 4, 5:
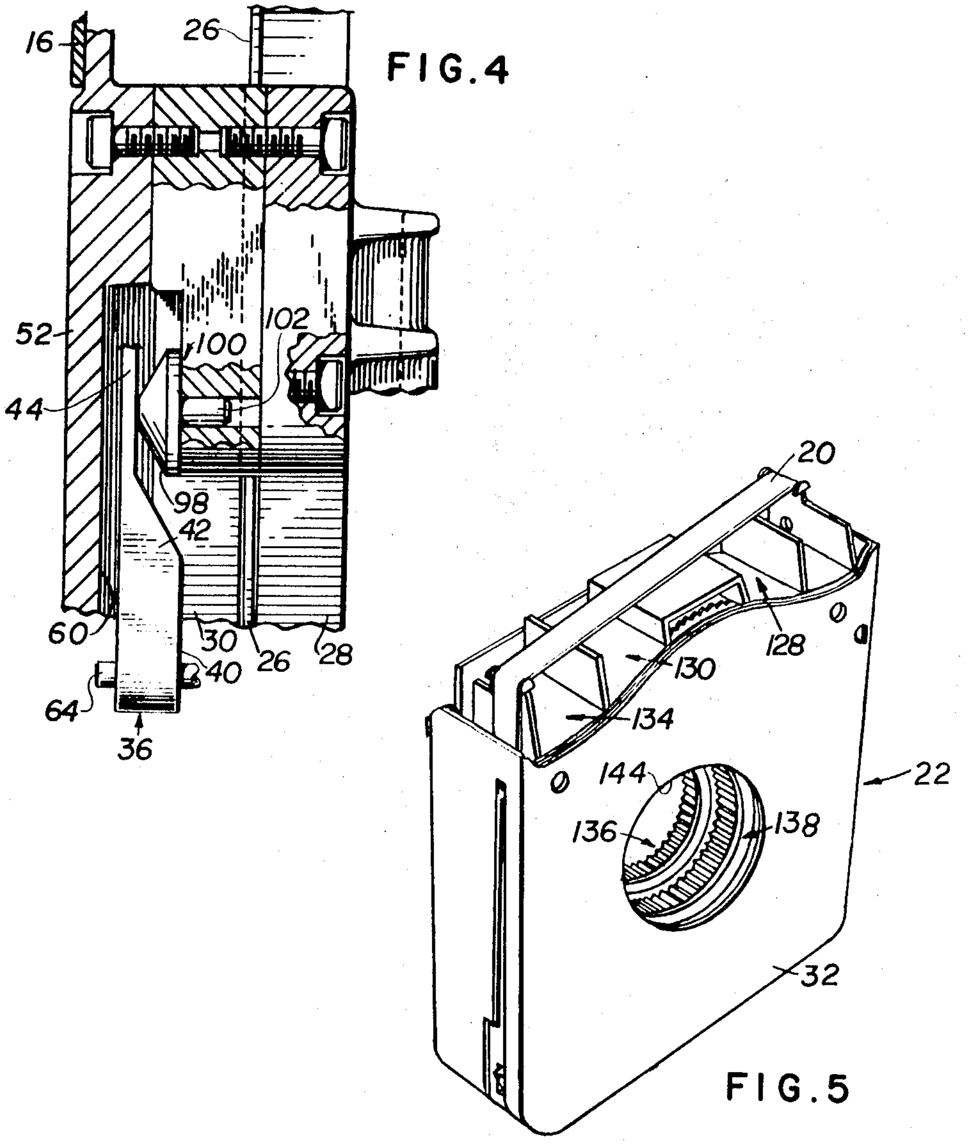
FIG. 4 is an enlarged, fragmentary view of a portion of the drive apparatus, showing the way in which it moves one of the tape guides into its operative position.
FIG. 5 is a perspective view of a cartridge usable with the tape guides coupled with the drive apparatus of the invention; and, FIG. 6 is a top plan view of the tape cartridge with the tape guides received therewithin.

Each drag link has a follower 64 (FIG. 3 and 4) which is loosely received within portions 58 and 60 of the corresponding track but is tightly received within the corresponding restricted section 62. A clearance of approximately 1 mil. is provided between follower 64 and the adjacent sides defining restricted section 62 to allow some movement of the follower 64 into and along the section with substantially no lateral movement of the follower.

The relatively loose fit of the follower 64 in the major portion of its track eliminates the need for close tolerances as the corresponding tape guide is being moved from its retracted position to its operative position. It is only when the follower enters the restricted section 62 near the operative position of the guide that tolerance minimums are required. When the follower is in the restricted section, the tape guide is effectively held against radial movement relative to the head path, the follower being substantially aligned with the guide.

Arm structure 46 includes a pair of first, radius arms 66 and 68 which are rotatably mounted on arbor 50 and extend downwardly therefrom when the tape guides are in their retracted positions. Arms 66 and 68 are relatively thin and have opposed flat faces so that the can overlap each other near arbor 50 and can be received within space 53 without interfering with other structures.

Each radius arm has a second arm 70 which is pivotally mounted by a pin 72 on the outer end of the radius arm. Pin 72 is intermediate the ends of arm 70, the latter being pivotally connected at one end to the drag link by a pin 74 and having a notched, angled extension 76 at its opposite end. A coil spring 78 biases extension 76 toward the adjacent radius arm. Arms 70 are also flat and relatively thin so that the can easily overlap with adjacent radius arms.

Figure 1:
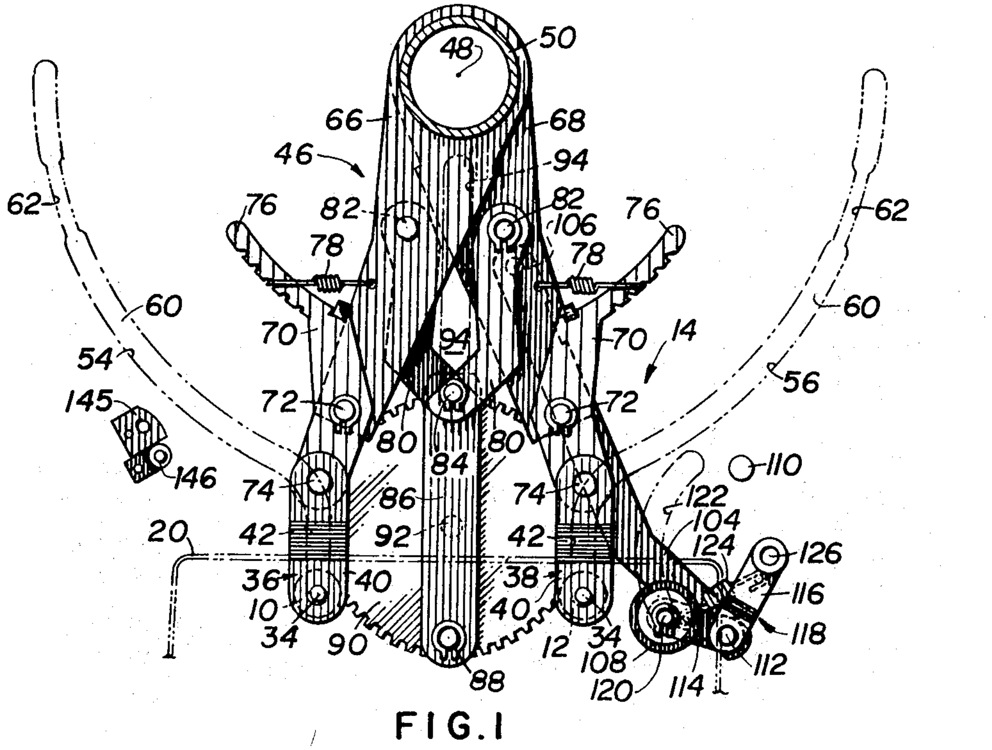
FIG. 1 is an elevational view of the drive apparatus of this invention showing the guides thereon in dashed lines and in retracted positions.

A pair of toggle links 80 are pivotally secured by pins 82 to the radius arms 66, 68 in spaced relationship to arbor 50 (FIG. 1). A pin 84 pivotally interconnects the outer ends of toggle links 80 with a master link 86 which is pivotally connected by a pin 88 to the outer peripheral margin of a crank wheel 90 mounted on support plate 52 for rotation about an axis 92 substantially parallel to and in vertical alignment with axis 48 (FIGS. 1 and 2). A slot 94 (FIG. 1) in support plate 52 receives pin 84 and guides the latter as crank wheel 90 rotates links 86 in the manner shown in FIG. 2. The crank wheel is coupled to a drive motor (not shown) by structure 96 (FIG. 3).

As each drag link is moved upwardly by its radius arm, surface 42 of the drag link moves into engagement with the inclined surface 98 (FIG. 4) of a camming element 100 having a shaft 102 received within guide member 30. The inner engagement of surfaces 42 and 98 causes the drag link to be forced against the adjacent surface of base plate 52 to thereby determine the position of the corresponding guide on the drag link axially of the head path.

Another link 104 (FIGS. 1 and 2) is pivotally connected by a pin 106 to radius arm 68 and is adapted to move a pinch roller 108 toward and adjacent to a rotatable capstan 110 whereby the tape between the pinch roller and the capstan can be driven by the latter in a predetermined direction. The lower end of link 104 is coupled to a pin 112 which pivotally interconnects a pair of crank arms 114 and 116 of a crank 118. Pinch roller 108 is rotatably mounted on a shaft 120 coupled to the outer end of crank arm 114, shaft 120 extending through a guide slot 122 in support plate 52. A coil spring 124 biases crank arms 114 and 116 toward each other. A pin 126 pivotally mounts the outer end of crank arm 116 on base plate 52.

Cartridge 22 has a pair of recesses 128 and 130 (FIG. 5) for receiving tape guides 10 and 12, respectively, when the cartridge is moved by a carriage mechanism 132 into an operative position beneath rotary head assembly 18 (FIG. 3). Also, the cartridge has a third recess 134 which receives the pinch roller as the cartridge is moved into its operative position. The tape guides and the pinch roller are shown in the cartridge recesses in FIG. 6.

In use, tape guides 10 and 12 are initially in their lower, retracted positions (FIG. 1) before the tape cartridge is moved to its operative position (FIG. 3) below the rotary head assembly 18. Disk 16 and capstan 110 will be set into rotation by actuating their motors (not shown). The tape guides will have been adjusted on their drag links by loosening attachment devices 34, if necessary, to rotate the tape guides about such devices so that the conical outer surfaces of the guides, when the latter are in their operative positions, will be properly oriented to assure the desired helix angle and to eliminate drift of the tape longitudinally of the guide. After devices have been adjusted, devices 34 are then tightened and can be prevented from being re-adjusted by placing a mass of thermoplastic material, such as an epoxy, over the ends of the devices. Thus, the adjustment is permanent.

The cartridge is then placed in carriage mechanism 132 (FIG. 3) and advanced thereby toward and into its operative position. The tape guides and the pinch roller are received within recesses 128, 130 and 134, respectively, (FIG. 5 and 6) and a pair of tape reels 136 and 138 (FIGS. 3 and 5) are received on spindles 140 and 142, respectively, whereby the tape reels can be selectively rotated by spindle drive means (not shown). An access opening 144 in the cartridge allows entry of the spindles thereinto.

To elevate the tape guides and the pinch roller into their operative positions, crank wheel 90 is rotated a half revolution by actuating the motor coupled with structure 96. Master link 86 is then moved from its lower vertical position (FIG. 1) to its upper vertical position. As the link commences to move, it will become inclined because its lower end is connected to the outer margin of the crank wheel and its upper end is maintained in a vertical plane passing through axis 48 and pin 84 since this pin is received within slot 94 (FIGS 1 and 2). The master link thus raises the lower ends of toggle links 80 to in turn rotate radius arms 66 and 68 in opposite directions about arbor 50. This causes arms 70 and the drag links to be moved about the lower position of the rotary head assembly.

The initial movement of the tape guides is straight upwardly from the cartridge, since the drag link followers are in straight track portions 58 (FIG. 2). Thus, the tape is initially pulled straight outwardly of the cartridge and allows the width of the latter to be at a minimum since the guides do not move laterally of the intended direction of tape travel as would occur if the tape guides rotated out of the cartridge.

When the followers reach the lower ends of arcuate track portions 60, the tape guides begin to move up and about the rotary head assembly. The loose fit of the followers in the tracks facilitates this movement of the guides. Finally, the followers enter the restricted sections 62 of the tracks and move therein until the master link reaches its upper vertical position. When this occurs, inclined surfaces 42 on the drag links will engage the adjacent surfaces 98 of camming elements 100 (FIG. 4) to urge the drag links toward and against support plate 52. The connections between radius arms 66 and 68 and their corresponding second arms 70 allow the radius arms to continue to move upwardly a slight distance relative to the second arms when the followers are received within the restricted track sections to assure a firm interengagement of surfaces 42 and 98. This feature also determines the operative positions of the tape guides with respect to the head paths to insure interchangeability of tape from machine to machine.

As the radius arms are elevated, link 104 elevates the pinch roller 108 so that it moves into its operative position at which it yieldably forces the tape against the capstan. Crank 114 and 116 are forced slightly apart when the pinch roller forces the tape against the capstan; thus, the restoring force of spring 124 is the force applied by the pinch roller to the tape. The tape is then driven by the capstan, preferably downwardly from guide 12, and the heads on disk 26 scan the tape.

When it is desired to return the tape guides to their retracted positions, the crank wheel is rotated again through a half revolution during which time the master link moves from its upper vertical position to its lower vertical position. The radius arms are then swung downwardly toward each other, forming the drag links downwardly and away from camming elements 100 and into the positions of FIG. 1. Also, the pinch roller returns to its FIG. 1 position under the influence of link 104. The cartridge can be moved by the carriage mechanism away from the base plate since the tape guides and the pinch roller will have returned to the respective recesses in the cartridge.

When the tape guides are in their operative positions, the tape moves past an erase head 145 having a cylindrical roller 146 adjacent thereto for guiding the tape past the head. Tape guide 10 clears both the erase head and the roller as it moves into and out of its operative position.

Subject matter disclosed, but not claimed herein, is claimed in various ones of the following copending United States patent applications, assigned to the same assignee as the present application and filed on the same day, June 26, 1970: as to the apparatus generally, including the bucket, patent application Ser. No. 50,059, Richard A. Hathaway, entitled "-Tape Transport Apparatus;" as to the spindles, patent application Ser. No. 50,204, Richard A. Hathaway, entitled "Spindle Construction for Tape Transport;" as to the cartridge, patent application Ser. No. 50,125, William W. Swain, "Tape Cartridge."

We claim:

1. Drive apparatus for a pair of tape guides comprising: a support; a pair of first arms; means mounting said arms on said support for rotation about a common axis; a pair of links; means pivotally connecting said links with respective arms at locations thereon spaced from said support, there being a link for each tape guide, respectively, each link adapted to be secured at its outer end to the corresponding tape guide; a means defining a track for each link, respectively; and means coupling each link with its respective track to cause the link to follow the same as the corresponding arm is rotated about said axis.

2. Drive apparatus as set forth in claim 1, wherein said coupling means includes a follower carried by the link and extending laterally therefrom into the corresponding track.

3. Drive apparatus as set forth in claim 1, wherein each track has a straight portion and an arcuate portion.

4. Drive apparatus as set forth in claim 1, wherein said connecting means includes a second arm for each first arm, respectively, each second arm being pivotally mounted intermediate its ends on the corresponding first arm, each link being pivotally connected to one end of the second arm, and means biasing said second arm in a predetermined direction relative to its first arm.

5. Drive apparatus as set forth in claim 1, wherein is provided a third link pivotally secured at one end thereof to one of said first arms intermediate the ends of the latter, and a crank pivotally secured at the opposite end of said third link and adapted to be coupled to a pinch roller.

6. Drive apparatus as set forth in claim 5, wherein said crank includes a pair of crank arms, a pin pivotally interconnecting the crank arms, and means biasing the crank arms toward each other, said opposite end of said third link being coupled with said pin.

7. Drive apparatus for a tape guide system comprising: a shaft; a pair of first arms rotatably mounted on said shaft and extending laterally therefrom; a second arm for each first arm, respectively, each second arm being pivotally mounted intermediate its ends on the outer end of the corresponding first arm; means biasing each second arm in a predetermined direction relative its first arm; and a link pivotally secured to one end of each second arm, respectively, each link adapted to be coupled with a corresponding tape guide, said first arms being rotatable in opposite directions from first locations corresponding to retracted positions of said tape guides to second locations corresponding to operative positions of the tape guides.

8. Apparatus as set forth in claim 7, wherein the opposite end of each second arm has a lateral extension thereon, said bias means includes a spring biasing each extension, respectively, toward the corresponding first arm.

9. Apparatus as set forth in claim 7, wherein each of the arms has a pair of opposed flat faces, said first arms being at least partially overlapped with each other adjacent to said shaft, each second arm being partially overlapped with the corresponding first arm.

10. Apparatus as set forth in claim 7, wherein each link has an inclined face, and including a support having a surface, said shaft being mounted on and extending laterally from the support, and means engageable with the inclined face of each link, respectively, for urging the same against said surface as a function of the movement of said first arms.

11. Apparatus as set forth in claim 7, wherein is included means coupled with said first arms for rotating the same in opposed directions about said shaft.

12. Apparatus as set forth in claim 11, wherein said rotating means includes a pair of toggle links pivotally secured to and extending outwardly from respective first arms, a master drive link pivotally secured at one end to the outer ends of said toggle links, and means coupled with said master link for moving said one end thereof along a rectilinear path relative to said shaft.

13. Apparatus as set forth in claim 12, wherein said shaft is substantially horizontal, and including a support having a slot therein, said slot being substantially radial to said shaft, a pin interconnecting said toggle and master links, said pin extending into said slot for guidance thereby.

14. Drive apparatus for a tape guide system adapted for use with a rotary head assembly of a tape transport comprising: a support having a surface; a shaft secured to the support and extending laterally from said surface; a pair of first arms rotatably mounted on said shaft and extending outwardly therefrom; a second arm for each first arm, respectively, each second arm being pivotally mounted on the outer end of the corresponding first arm and extending outwardly therefrom; a drag link pivotally mounted on the outer end of each second arm, respectively, each drag link adapted to be coupled to a respective tape guide, said first arms being movable from first locations with said drag links adjacent to each other to second locations with said drag links remote from each other; means biasing each second arm, respectively, in a direction to urge its corresponding drag link further away from the drag link of the other second arm; means on said surface of the support for defining a track for each drag link, respectively, each drag link having a follower received within the corresponding track for movement therealong; and means coupled with said first arms for rotating the same through a predetermined arc about said shaft.

15. Apparatus as set forth in claim 14, wherein said surface is generally vertically disposed, said shaft being generally horizontally disposed, each track having a vertical portion and an arcuate portion.

16. Apparatus as set forth in claim 15, wherein the arcuate portion of each track has a restricted section, the follower of each drag link being loosely received within the major part of the arcuate portion of each track and being tightly received within the restricted section.

17. Apparatus as set forth in claim 14, wherein is included a connector link pivotally secured to one of said first arms intermediate the ends of the latter for movement therewith, a crank having a pair of pivotally interconnected, relatively angularly disposed crank arms and means biasing the crank arms toward each other, said connector link extending outwardly from said one first arm and pivotally secured to said crank at the junction between said crank arms thereof.

18. In a tape transport of the type having a rotary head assembly and adapted for use with a tape cartridge having an open extremity:

a base plate adapted to support said rotary head assembly at a location aligned with the operative position of said open extremity of the cartridge adjacent to the base plate;

a pair of tape guides; and means comprising followers on the guides and a pair of tracks individually mounting the tape guides for movement initially straight outwardly from said operative position and then in curved fashion around the proximate face of said rotary head assembly, whereby a stretch of tape extending along said open extremity can be pulled outwardly from the cartridge and wrapped about a portion of said rotary head assembly, the straight portions of said tracks being spaced by a distance less than the diameter of said rotary head assembly.

19. In a tape transport adapted for use with a tape cartridge having a pair of recesses therein adjacent to an open extremity thereof:

a base plate;

a rotary head assembly secured to the base plate in alignment with an operative position of said open extremity of the cartridge adjacent to the base plate;

a pair of tape guides adapted to enter the recesses of the cartridge; and means comprising a pair of tracks for mounting the tape guides for initial straight movement away from respective locations corresponding to the positions of the recesses when the open extremity is in said position and then for arcuate movement about the proximate face of said rotary head assembly, whereby the tape guides can move out of said recesses to wrap a stretch of tape initially extending along said open extremity about a portion of the rotary head assembly, the straight portions of said tracks being spaced by a distance less than the diameter of said rotary head assembly.

20. In a video reproducing and/or recording system of the type in which multiple transducers are rotatably mounted relative to a base plate and a video cartridge presenting a continuous stretch of magnetic tape is so positioned adjacent the base plate and relative to the transducers that said stretch of tape is withdrawn from said cartridge and wrapped about a portion of the working path of said transducers, a tape guide apparatus for selectively withdrawing said stretch of tape from said cartridge and contouring it to said path and permitting said stretch to return to said cartridge, comprising the combination of:

an arbor;

a pair of radius arms swingable between first terminal positions and second terminal positions;

a pair of lever members, one mounted on each radius arm, each lever member comprising a forward portion effectively providing an extension of its associated arm and a central portion pivotally mounted on said arm and a rear wing portion extending away from its associated arm;

a biasing element between the wing portions and their respective associated radius arms for permitting the wing portions to rotate away from the radius arms as the radius arms are elevated;

drag links having upper ends pivotally secured to said radius arms;

tape guide members secured to the other ends of said drag links, each tape guide member comprising a tape take-up portion adapted to be positioned outboard of said stretch and a follower portion;

a support plate being formed with guide grooves defining the initial linear and then curved paths taken by said follower portions in constraining the take-up portions to define said wrap; and a drive for elevating and depressing said radius arms.

* * * * *